(12) United States Patent
Takahata (10) Patent No.: US 8,220,796 B2
(45) Date of Patent: Jul. 17, 2012

(54) SHEET OUTPUT DEVICE AND ORIGINAL SHEET TRANSPORTING DEVICE

(75) Inventor: Muneaki Takahata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 107 days.

(21) Appl. No.: 12/731,167

(22) Filed: Mar. 25, 2010

(65) Prior Publication Data

US 2010/0244357 A1 Sep. 30, 2010

(30) Foreign Application Priority Data

Mar. 27, 2009 (JP) ................................. 2009-078140

(51) Int. Cl.
B65H 29/70 (2006.01)
(52) U.S. Cl. ......... 271/188; 271/314; 271/209; 271/212
(58) Field of Classification Search ................. 271/3.14, 271/188, 209, 212, 314
See application file for complete search history.

(56) References Cited

U.S. PATENT DOCUMENTS

| 6,095,517 | A * | 8/2000 | Dinatale | 271/212 |
| 7,717,424 | B2 | 5/2010 | Sakakibara et al. | |
| 2005/0179193 | A1 * | 8/2005 | Elenes | 271/119 |
| 2007/0210512 | A1 | 9/2007 | Sakakibara et al. | |
| 2008/0001351 | A1 * | 1/2008 | Lee et al. | 271/306 |

FOREIGN PATENT DOCUMENTS

| JP | 08-245034 | | 9/1996 |
| JP | 9030708 | A | 2/1997 |
| JP | 9300760 | A | 11/1997 |
| JP | 11-079514 | | 3/1999 |
| JP | 11-208957 | | 8/1999 |
| JP | 2000118822 | A | 4/2000 |
| JP | 2000-327198 | | 11/2000 |
| JP | 2001-206605 | | 7/2001 |
| JP | 2002068552 | A | 3/2002 |
| JP | 2005035711 | A | 2/2005 |
| JP | 2006-151617 | | 6/2006 |
| JP | 2006151669 | A | 6/2006 |
| JP | 2007-022766 | | 2/2007 |
| JP | 2007238252 | A | 9/2007 |

OTHER PUBLICATIONS

Notice of Reasons for Rejection for Japanese patent application No. 2009-078140 mailed Mar. 29, 2011.
The First Office Action for Chinese patent application No. 201010155525.4 mailed Jan. 21, 2012.

* cited by examiner

Primary Examiner — Michael McCullough
(74) Attorney, Agent, or Firm — Banner & Witcoff, Ltd.

(57) ABSTRACT

A sheet output device includes a sheet receiver and a group of rollers. The group of rollers includes a plurality of output rollers arranged in the widthwise direction of the sheet and a plurality of pinch rollers arranged upward of the plurality of output rollers. The plurality of pinch rollers pinch the sheet with the plurality of output rollers and transport the sheet onto the sheet receiver. The sheet output device further includes at least one corrugation roller which is disposed between corresponding two of the plurality of output rollers and which has a diameter larger than the plurality of output rollers. The plurality of output rollers are rotatable relatively with respect to the at least one corrugation roller. The at least one corrugation roller rotates by being pushed by a leading end of the transported sheet.

12 Claims, 8 Drawing Sheets

SHEET OUTPUT DEVICE AND ORIGINAL SHEET TRANSPORTING DEVICE

CROSS REFERENCE TO RELATED APPLICATION

The present application claims priority from Japanese Patent Application No. 2009-078140, filed on Mar. 27, 2009, the disclosure of which is incorporated herein by reference in its entirely.

BACKGROUND

1. Technical Field

The present invention relates to a sheet output device configured to output a sheet transported in a device body to the outside, and an original sheet transporting device including the sheet output device.

2. Related Art

A sheet output device including a plurality of rollers, which are larger in diameter than output rollers to corrugate an ejecting sheet, arranged coaxially with the output rollers so as to be interposed between the plurality of output rollers is known. Such a roller for corrugating the ejecting sheet is called "corrugation roller." The reliability of stacking sheets may be enhanced by using the corrugation rollers.

However, it is still difficult to perform both stacking output mode outputting a following sheet on a preceding sheet and inserting output mode outputting a following sheet to be inserted between a preceding sheet and a sheet tray reliably.

SUMMARY

A need has arisen to provide a sheet output device and an original sheet transporting device which perform both the inserting output mode and the stacking output mode reliably.

According to aspects of the invention, a sheet output device witch is configured to output a sheet, comprises a sheet receiver and a group of rollers. The group of rollers includes a plurality of output rollers arranged in the widthwise direction of the sheet and a plurality of pinch rollers arranged upward of the plurality of output rollers. Each of the plurality of pinch rollers is configured to pinch the sheet with corresponding one of the plurality of output rollers and transports the sheet onto the sheet receiver. The sheet output device further comprises at least one corrugation roller arranged coaxially with the output rollers. The at least one corrugation roller is disposed between corresponding two of the plurality of output rollers and has a diameter larger than the plurality of output rollers. The plurality of output rollers are configured to be rotatable relatively with respect to the at least one corrugation roller. The at least one corrugation roller rotates by being pushed by a leading end of the transported sheet.

According to aspects of the invention, an original sheet transporting device comprises an input tray on which an original sheet is stacked, a sheet output device, and a feed mechanism which feed the original sheet form the input tray to the sheet output device. The sheet output device comprises a sheet receiver and a group of rollers. The group of rollers includes a plurality of output rollers arranged in the widthwise direction of the sheet and a plurality of pinch rollers arranged upward of the plurality of output rollers. Each of the plurality of pinch rollers is configured to pinch the sheet with corresponding one of the plurality of output rollers and transport the sheet onto the sheet receiver. The group of rollers further includes at least one corrugation roller arranged coaxially with the output rollers. The at least one corrugation roller is disposed between corresponding two of the plurality of output rollers and has a diameter larger than the plurality of output rollers. The plurality of output rollers are configured to be rotatable relatively with respect to the at least one corrugation roller, and the at least one corrugation roller rotates by being pushed by a leading end of the transported sheet.

BRIEF DESCRIPTION OF THE DRAWINGS

For a more complete understanding of the aspects of the invention, the needs satisfied thereby, and the features and advantages thereof, reference now is made to the following descriptions taken in connection with the accompanying drawings wherein.

DESCRIPTION OF PREFERRED EMBODIMENTS

Embodiments of the invention and their features and advantages may be understood by referring to FIGS. 1-9B, like numerals being used for like corresponding parts in the various drawings. Referring now to the drawings as needed, an embodiment of the invention will be described in detail. In the description given below, the term "upstream side" and "downstream side" designate upstream side and downstream side with respect to a transport direction of an original sheet (an example of a sheet).

Figure 1:
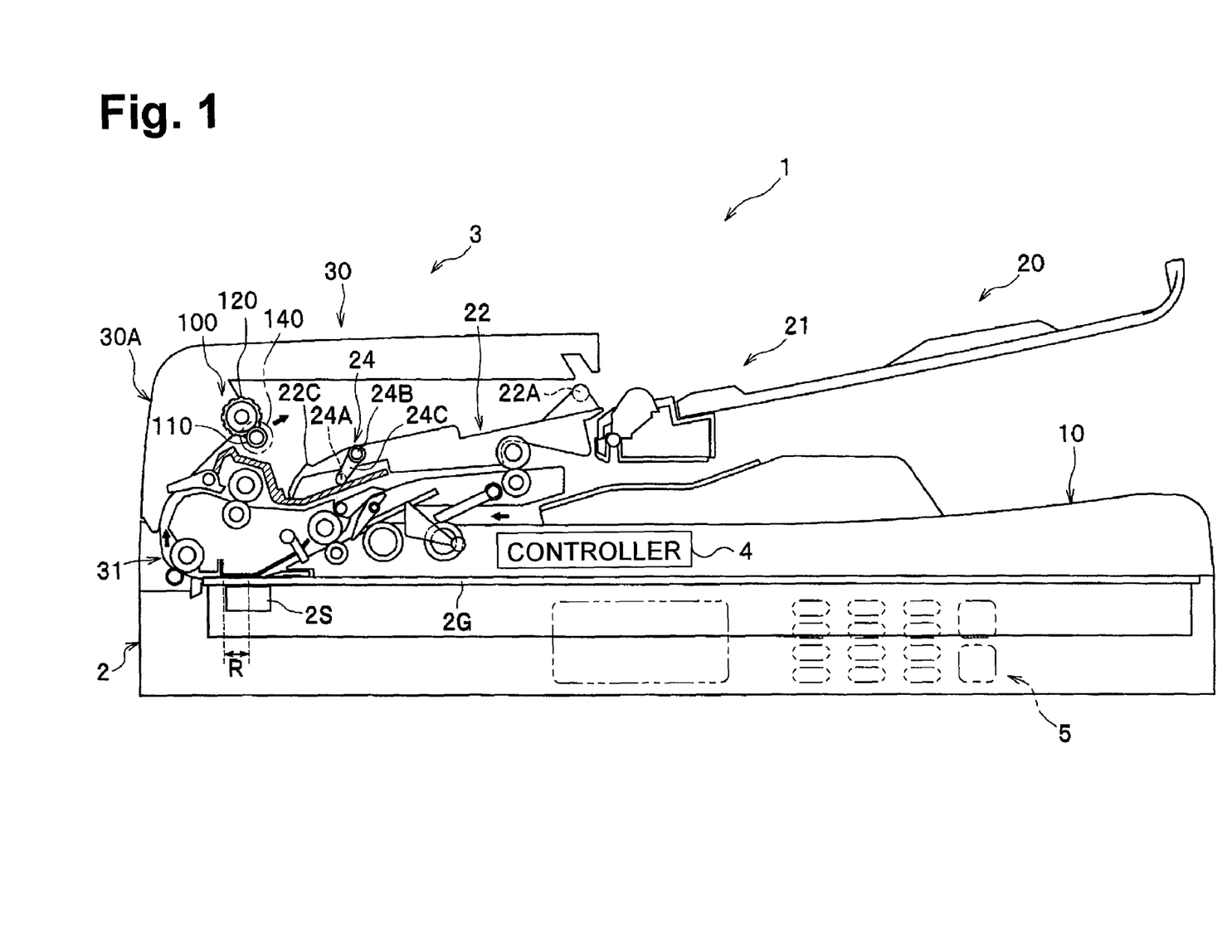
FIG. 1 is an entire configuration of a sheet output device and an original sheet reading apparatus according to an embodiment of the invention.

As shown in FIG. 1, an original sheet reading apparatus 1 mainly includes a flat bed scanner 2, an original sheet transporting device 3 configured to transport the original sheet (an example of the sheet) to a read position R, and a control device 4 configured to control operations of original sheet reading.

<Configuration of Flat Bed Scanner>

The flat bed scanner 2 mainly includes a platen glass 2G which serves as an original sheet bed for placing the original sheet, and an image sensor 2S. In the flat bed scanner 2, the original sheet placed on the platen glass 2G can be read while being scanned and also the original sheet transported to the read position R can be read by the image sensor 2S.

<Configuration of Original Sheet Transporting Device>

The original sheet transporting device 3 is a device configured to transport the original sheet to the read position R and cause the image sensor 2S to read one side or both sides of the original sheet, is arranged above the flat bed scanner 2, and is provided so as to be openable and closable with respect to the platen glass 2G. The original sheet transporting device 3 mainly includes a supply tray 10 for placing the original sheet, an output tray 20 for receiving the original sheet being output, and an original sheet transporting unit 30 configured to transport the original sheet.

<Configuration of Output Tray>

The output tray 20 is arranged above the supply tray 10, and includes a tray 21 and a flap 22 (an example of a sheet receiver) arranged on the upstream side of the tray 21. The tray 21 may be fixed so as not to be displaced with respect to the original sheet transporting unit 30.

The flap 22 is supported on a body frame 30A of the original sheet transporting device 3 so as to be pivotable upward and downward with respect to the tray 21 about a pivotal axis 22A provided on the downstream side. The flap 22 is formed with a bent portion 22C at a distal end portion on the upstream side so as to be bent downward. A cam 24 as an example of a moving mechanism engages the distal end portion of the flap 22 on the upstream side.

The cam 24 includes a push-up bar 24A extending in the widthwise direction between both ends of the device under the flap 22, shaft portions 24B arranged at both sides of the flap 22, and coupled portions 24C configured to couple both ends of the push-up bar 24A and the respective shaft portions 24B. The respective shaft portions 24B are rotatably supported by the body frame 30A.

Figure 4:
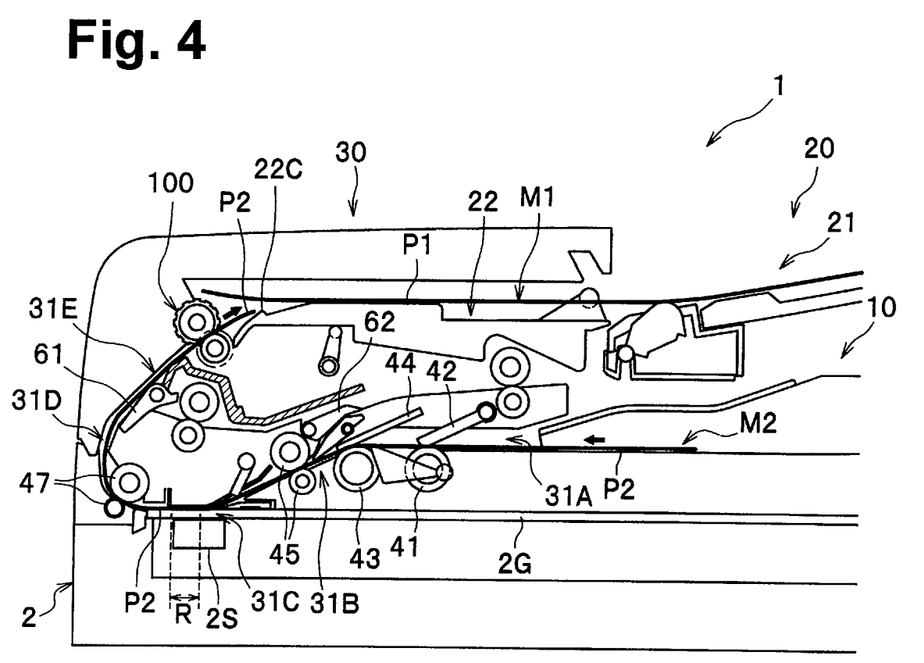
FIG. 4 is an explanatory drawing showing operations of single-sided reading.

The cam 24 rotates in the normal and reverse directions by a driving device (not shown) controlled by the control device 4, and causes a flap 22 to pivot between a state of being at a lower position shown in FIG. 1 and a state of being at an upper position shown in FIG. 4. Accordingly, the mode of outputting the original sheet can be switched between a stacking output mode and an inserting output mode, described later.

<Configuration of Original Sheet Transporting Unit>

Figure 2:
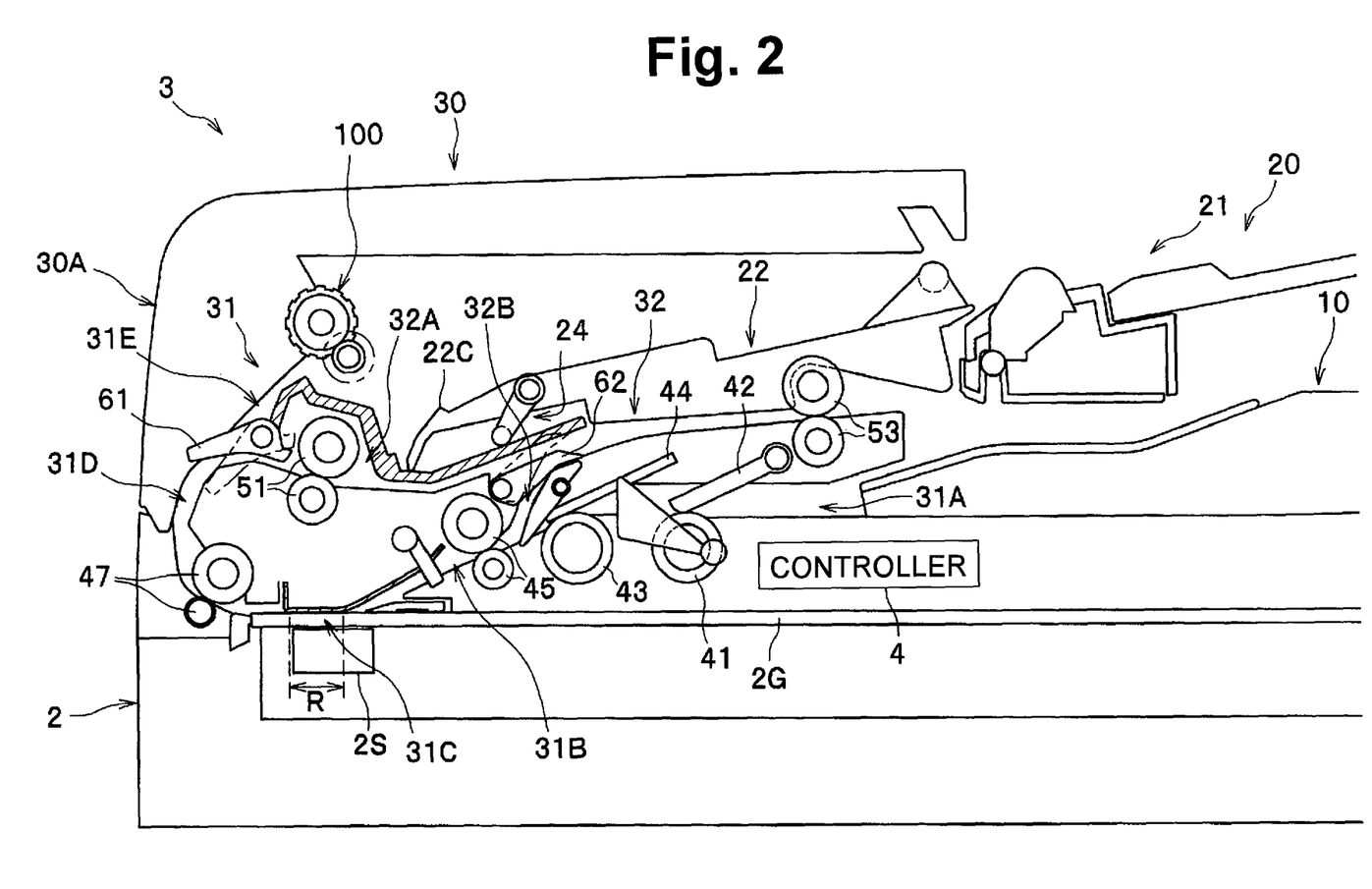
FIG. 2 is an enlarged view of an original sheet transporting unit.

As shown in FIG. 2, the original sheet transporting unit 30 has a transporting path 31 through which the original sheet is transported from the supply tray 10 to the output tray 20 and a reverse path 32 for switching back the original sheet.

The transporting path 31 has an inlet path 31A extending substantially horizontally from the supply tray 10, an inclined path 31B extending obliquely downward from the inlet path 31A, a horizontal path 31C extending substantially horizontally from the inclined path 31B, a curved path 31D extending upward in an arcuate shape from the horizontal path 31C, and an output path 31E extending obliquely upward from the curved path 31D toward the output tray 20. The lower side of the horizontal path 31C of the transporting path 31 corresponds to the read position R opposing the image sensor 2S via the platen glass 2G.

The transporting path 31 is provided with a transporting mechanism configured to transport the original sheet from the supply tray 10 to the output tray 20 via the read position R. The transporting mechanism mainly includes an inlet roller 41, an inlet nip strip 42, a separation roller 43, and a separation nip strip 44 provided in the inlet path 31A, a first transporting roller 45 provided in the inclined path 31B, a second transporting roller 47 provided in the curved path 31D, and an output roller group 100 provided in the output path 31E.

The inlet roller 41 and the inlet nip strip 42 are members for causing the original sheet on the supply tray 10 to approach the separation roller 43, and the separation roller 43 and the separation nip strip 44 are members configured to separate and feed the original sheets one by one to the read position R. The first transporting roller 45 and the second transporting roller 47 are rollers configured to transport the original sheet in the transporting path 31, and the output roller group 100 is configured to output the original sheet to the output tray 20 after reading an image of the original sheet.

Here, the output roller group 100 has a function as a sheet output device for outputting the original sheet being transported to the output tray 20. The output roller group 100 will be described later.

The reverse path 32 includes a first reverse path 32A branching from the curved path 31D and extending toward the outside (the right side in FIG. 2), and a second reverse path 32B branching from the substantially center of the first reverse path 32A, extending obliquely downward, and joining the inclined path 31B. The reverse path 32 is provided with a reverse rotation mechanism configured to transport or guide the original sheet at the time of switchback for double-sided reading.

The reverse rotation mechanism includes a third transporting roller 51 and a switch-back roller 53 provided in the first reverse path 32A, a first guide member 61 provided at a branch portion between the curved path 31D and the first reverse path 32A, and a second guide member 62 provided at a branch portion between the first reverse path 32A and the second reverse path 32B.

The third transporting roller 51 is a roller configured to transport the original sheet in the first reverse path 32A, and the switch-back roller 53 is a roller configured to output a part of the original sheet to the outside. The first guide member 61 and the second guide member 62 are members configured so as to be pivotable for switching a path where the original sheet is transported.

<Configuration of Control Device>

The control device 4 is provided with a CPU, a RAM, a ROM, an I/O circuit, and the like, not shown, and is arranged at an adequate position in the original sheet transporting device 3. Then, the control device 4 switches the positions of the cam 24 and the respective guide members 61 and 62 corresponding to single-sided reading and double-sided reading. The selection of the single-sided reading and the double-sided reading is performed by a user operating inputted into an operating unit 5 including a plurality of operating buttons as shown in FIG. 1.

<Operations of Original Sheet Reading Apparatus>

Operations of the original sheet reading apparatus 1 configured as described above will be described.

<Operations at the Time of Double-Sided Reading>

Figure 3A:
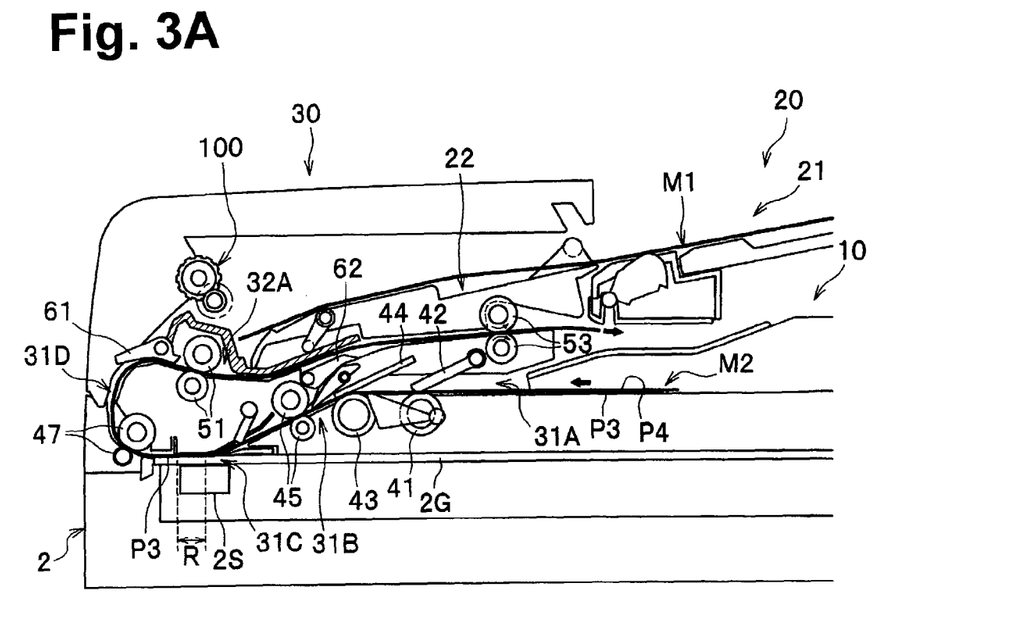
FIGS. 3A and 3B are explanatory drawings showing operations of double-sided reading.

As shown in FIG. 3A, at the time of the double-sided reading, a following original sheet M2 is set on the supply tray 10 with a front read surface P3 facing downward and a reverse read surface P4 facing upward. When the user operates the operating unit 5 (see FIG. 1) and selects the double-sided reading, the flap 22 pivots downward, the first guide member 61 pivots upward, and the second guide member 62 pivots downward, respectively.

When the user input a command indicating to start reading into the operating unit 5, the following original sheet M2 on the supply tray 10 is transported to the read position R by the separation roller 43, the first transporting roller 45, and the like, and the front read surface P3 is read by the image sensor 2S. Subsequently, the following original sheet M2 is transported in the curved path 31D by the second transporting roller 47, enters the first reverse path 32A along a lower surface of the first guide member 61, and is transported in the first reverse path 32A toward the outside by the third transporting roller 51 and the switch-back roller 53.

When the substantially entire part of the following original sheet M2 is output from the switch-back roller 53, the switch-back roller 53 is stopped temporarily. At this time, the following original sheet M2 assumes a state with the front read surface P3 facing upward and the reverse read surface P4 facing downward. The first guide member 61 pivots downward and the second guide member 62 pivots upward respectively to switch the path of the original sheet.

Figure 3B:
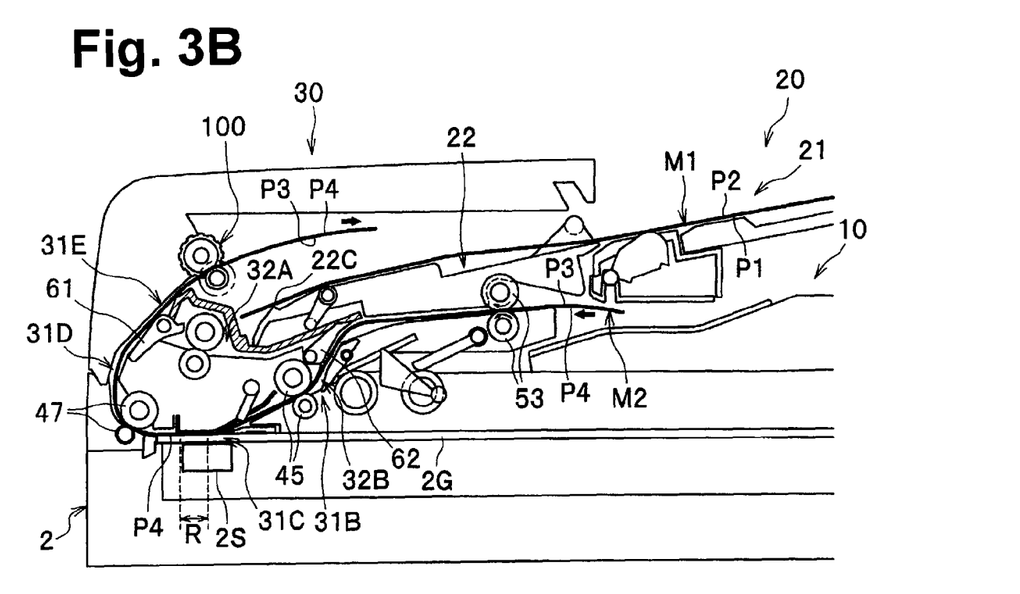

Then, by the reverse rotation of the switch-back roller 53, as shown in FIG. 3B, the following original sheet M2 is pulled back to the first reverse path 32A, enters the second reverse path 32B along a lower surface of the second guide member 62, is transported again to the inclined path 31B, and is transported to the read position R by the first transporting roller 45, so that the reverse read surface P4 is read by the image sensor 2S. Subsequently, the following original sheet is transported in the curved path 31D and the output path 31E by the second transporting roller 47 and the output roller group 100, and is output onto the output tray 20 with the front read surface P3 facing downward and the reverse read surface P4 facing upward.

Here, in the state in which the flap 22 is at the lower position, the bent portion 22C of the flap 22 is positioned downward of nip portions of the output roller group 100, so that trailing ends of preceding original sheets M1, which are already output and placed on the bent portion 22C, are positioned downward of the nip portions of the output roller group 100. Accordingly, the following original sheets M2 are output and stacked on an upside of the preceding original sheets M1 which are already output onto the output tray 20. The output mode at this time is referred to as the stacking output mode.

In the stacking mode, the original sheets are output so as to be stacked on the upside of the preceding original sheets with the front read surfaces facing downward and the reverse read surfaces facing upward, therefore the order of pages of the original sheets M1 and M2 can be arranged in the order of P1, P2, P3, and P4 from below. This order is the same as the order of the pages when the original sheets M1 and M2 are placed on the supply tray 10.

<Operations at the Time of Single-Sided Reading>

As shown in FIG. 4, at the time of single-sided reading, the following original sheet M2 is set on the supply tray 10 with a read surface P2 facing downward. When the user operates the operating unit 5 and selects the single-sided reading, the flap 22 pivots upward, the first guide member 61 pivots downward respectively.

When the user input the command indicating to start reading into the operating unit 5, the following original sheet M2 on the supply tray 10 is transported to the read position R by the separation roller 43, the first transporting roller 45, and the like, and the front read surface P2 is read by the image sensor 2S. Subsequently, the following original sheet M2 is transported in the curved path 31D and the output path 31E by the second transporting roller 47 and the output roller group 100 and is output onto the output tray 20 with the read surface P2 facing upward.

Here, in the state in which the flap 22 is at the upper position, the bent portion 22C of the flap 22 is positioned upward of the nip portion of the output roller group 100, so that the trailing ends of the preceding original sheets M1 output and placed on the flap 22 are positioned upward of the nip portion of the output roller group 100. Accordingly, the following original sheet M2 is output so as to come into contact with rear side portions of the preceding original sheets M1 which are already output onto the output tray 20 and then is inserted under the preceding original sheets M1. The output mode at this time is referred to as the inserting output mode.

In the inserting output mode, since the following original sheet M1 is output so as to be inserted under the preceding original sheets M1 with the read surfaces facing up, the order of the pages of the original sheets M1 and M2 can be arranged in the order of P1, P2 in sequence from the top. This order is the same as the order of the pages when the original sheets M1 and M2 are placed on the supply tray 10.

<Structure of Output Roller Group>

Figure 5:
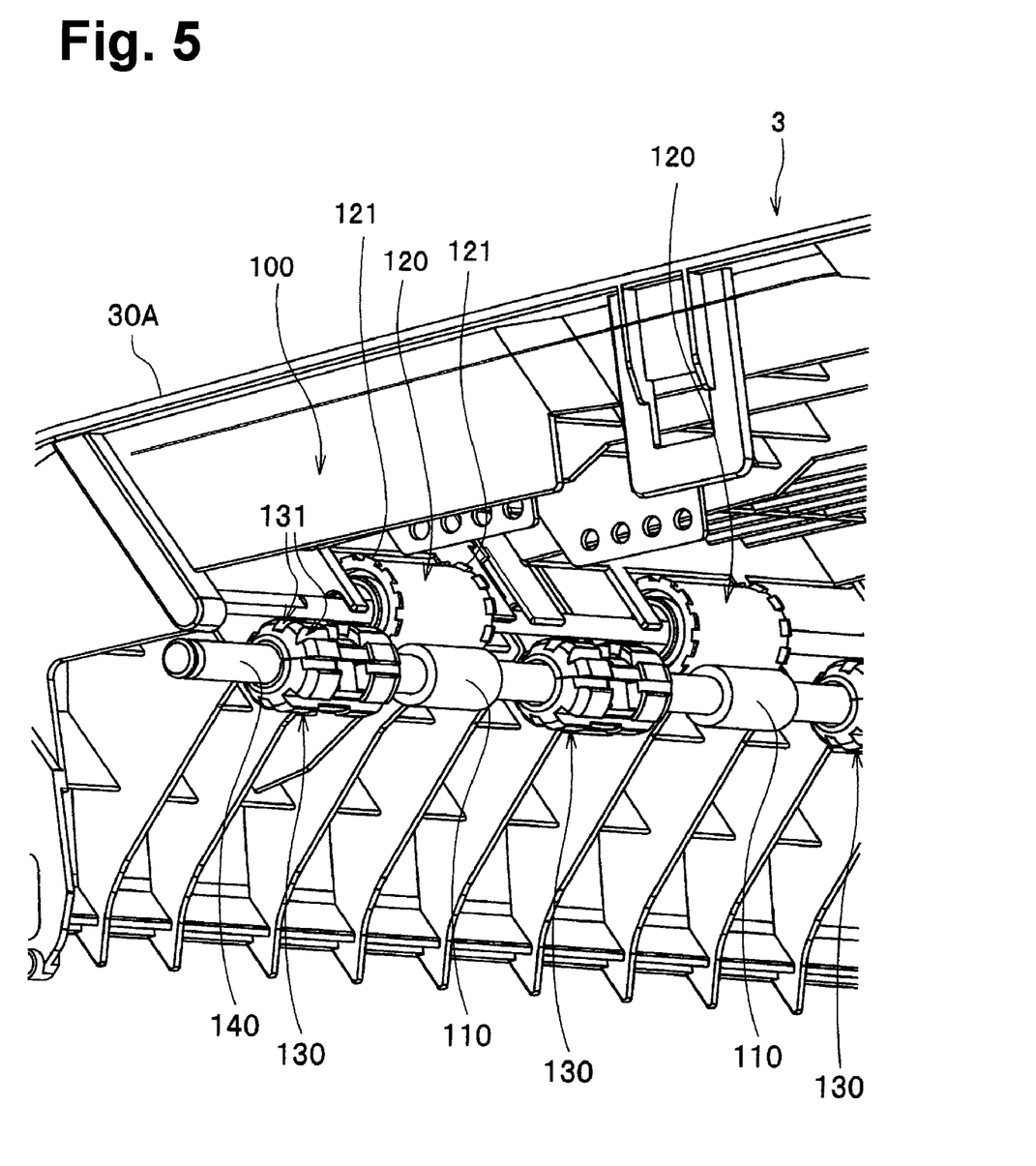
FIG. 5 is an enlarged perspective view showing output rollers in an enlarged scale.

Subsequently, the structure of the output roller group 100 will be described in detail. As shown in FIG. 5, the output roller group 100 includes a plurality of output rollers 110 arranged at a distance from each other in the width direction of the original sheet (the direction orthogonal to the transport direction), a plurality of pinch rollers 120 arranged upward of the output rollers 110 and corrugation rollers 130 provided coaxially with the output rollers 110.

Each of the plurality of output rollers 110 are a cylindrical member, and fixed integrally with a shaft 140 extending in the widthwise direction of the original sheet. A drive force is transmitted to the shaft 140 via a gear or the like from a drive source (not shown) and, when the drive force is transmitted to the shaft 140, the shaft 140 and the output rollers 110 rotate integrally.

The pinch rollers 120 are rotatably supported by the body frame 30A of the original sheet transporting device 3 in a state of being in contact with the output rollers 110, and are rotated in association with the rotation of the output rollers 110. Then, the pinch rollers 120 pinch the original sheet with the output rollers 110 and transport the same onto the above-described flap 22.

More specifically, the pinch rollers 120 are arranged at positions not right above the output rollers 110, but at positions shifted toward the upstream side from the positions right above the output rollers 110 as shown in FIG. 1. Therefore, the original sheet pinched between the pinch rollers 120 and the output rollers 110 is output obliquely upward as shown by an arrow in FIG. 1.

As shown in FIG. 5, a plurality of pushing portions 121 projecting radially outward are formed on peripheral surfaces of the pinch rollers 120 at both end portions thereof at a distance from each other in the circumferential direction. The respective pushing portions 121 pushes the trailing end of the original sheet forward in the transport direction by the pinch rollers 120 rotating counterclockwise in FIG. 5.

Each of the corrugation rollers 130 is a roller having a larger diameter than the output roller 110, and are arranged alternately with the output rollers 110 in the widthwise direction of the original sheet. Accordingly, the original sheet which comes into contact with the respective rollers 110 to 130 assumes a wavy shape, so that the resiliency of the original sheet is increased. Each of the corrugation rollers 130 may be arranged so as to be interposed between corresponding two of the plurality of output rollers 110 and, for example, only one corrugation roller 130 is also applicable.

Figure 6:
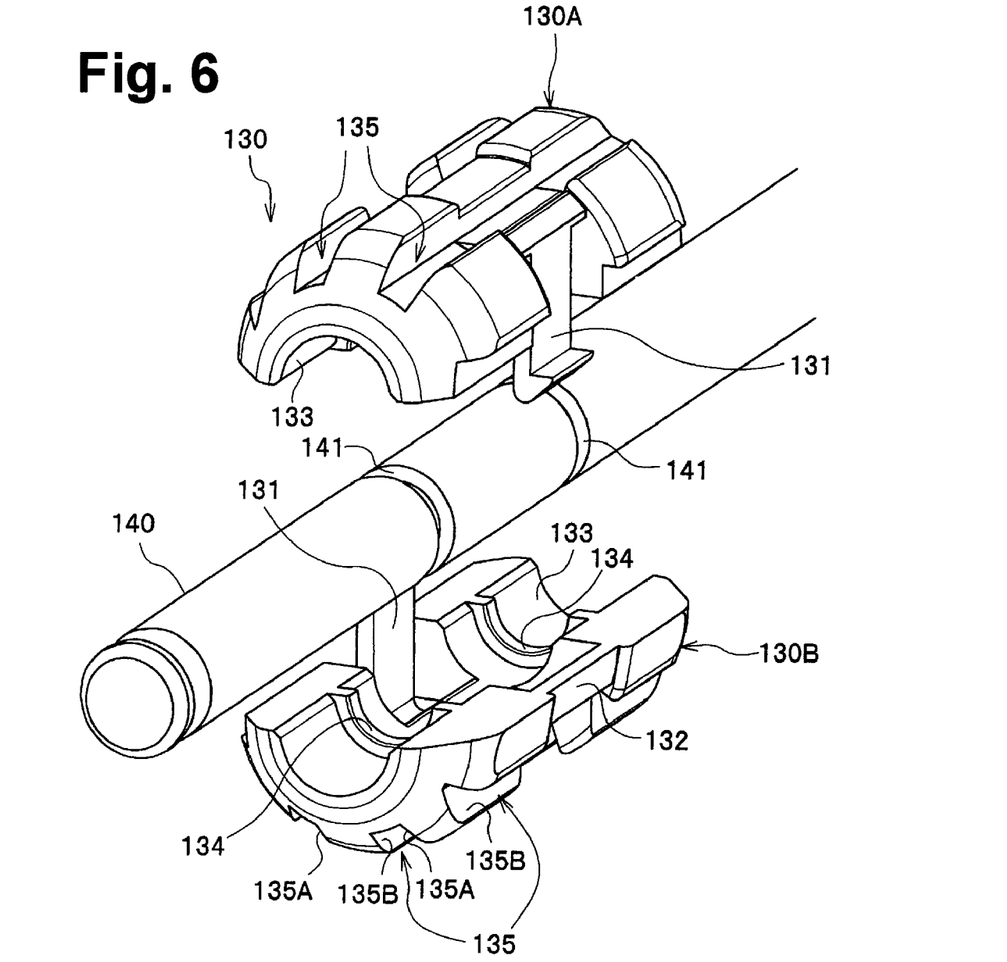
FIG. 6 is an exploded perspective view showing a corrugation roller decomposed from a shaft.

Then, the corrugation rollers 130 are provided so as to be rotatable relatively with respect to the shaft 140, thereby being rotatable relatively with respect to the output rollers 110. More specifically, as shown in FIG. 6, the corrugation roller 130 is formed by fitting two semi-cylindrical components 130A and 130B divided along a reference plane including a center line of the shaft 140.

The respective components 130A and 130B are resin parts formed into the same shape by the same metal die, and each include a locking claw 131 formed so as to be bent into a dogleg shape at a distal end thereof, and a locking rib 132 whereby the locking claw 131 is locked. Inner surfaces 133 of the components 130A and 130B each are formed with two protrusions 134 protruding inward at a distance in the axial direction.

In contrast, the shaft 140 is formed with two annular grooves 141 extending over the entire circumference at positions corresponding to the two protrusions 134. Accordingly, when the components 130A and 130B are fitted to each other in a state in which the shaft 140 is interposed between the components 130A and 130B, the respective protrusions 134 enter and engage the annular grooves 141, so that the corrugation roller 130 is prevented from being displaced with respect to the shaft 140 in the axial direction.

As an example of an engaging portion, the corrugation roller 130 is formed with a plurality of grooves 135 so as to penetrate in the axial direction on the peripheral surface thereof at a distance from each other in the circumferential direction. One of a pair of side surfaces which define the grooves 135 is formed as a leading end contacting surface 135A with which a leading end of the original sheet comes into contact (engagement), and the other side surface is formed as a trailing end contacting surface 135B which comes into contact (engagement) with the trailing end of the original sheet.

Figure 7:
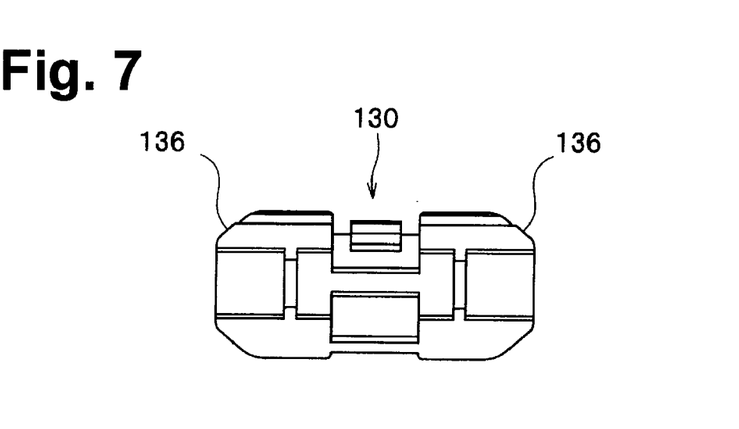
FIG. 7 is a drawing of the corrugation roller.

As shown in FIG. 7, the corrugation roller 130 is tapered at axial both end portions 136 thereof so as to be reduced in outer diameter as it goes outward in the axial direction. Accordingly, the original sheet is able to assume a smooth wavy shape.

<Effects of Corrugation Roller>

Subsequently, effects of the corrugation roller 130 will be described.

<Effects in Inserting Output Mode>

Figure 8A:
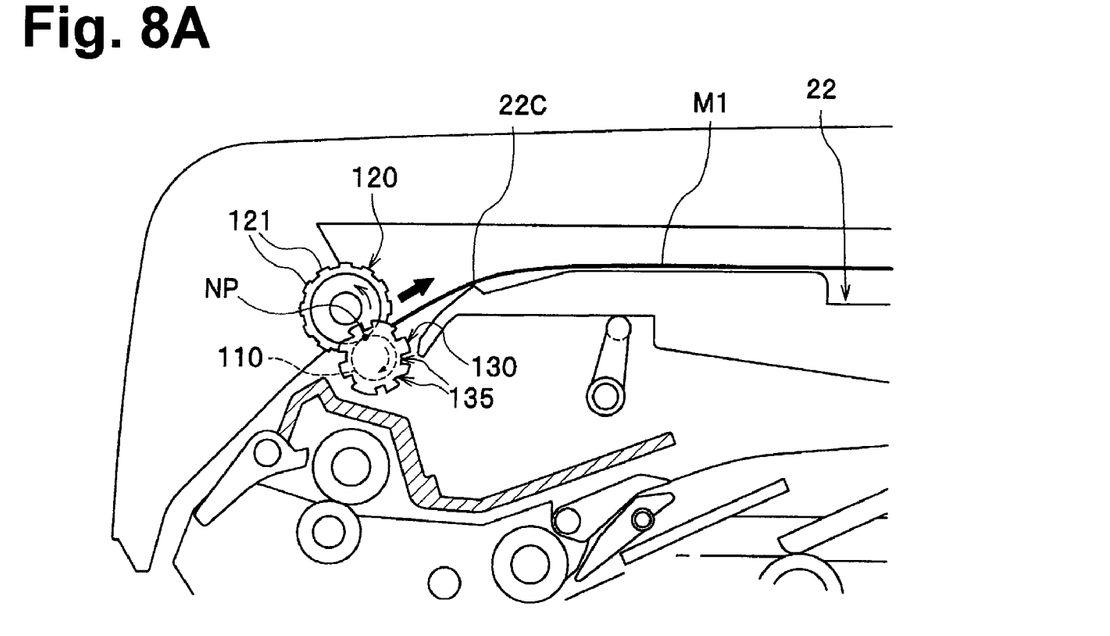
FIGS. 8A and 8B are drawing showing operations in an inserting output mode.

As shown in FIG. 8A, in the inserting output mode, even when the trailing end of the preceding original sheet M1 leaves nip portions NP between the output rollers 110 and the pinch rollers 120, the trailing end of the preceding original sheet M1 is prevented from being kicked downward by the grooves 135 on the corrugation rollers 130 because the corrugation rollers 130 do not rotate then.

Figure 8B:
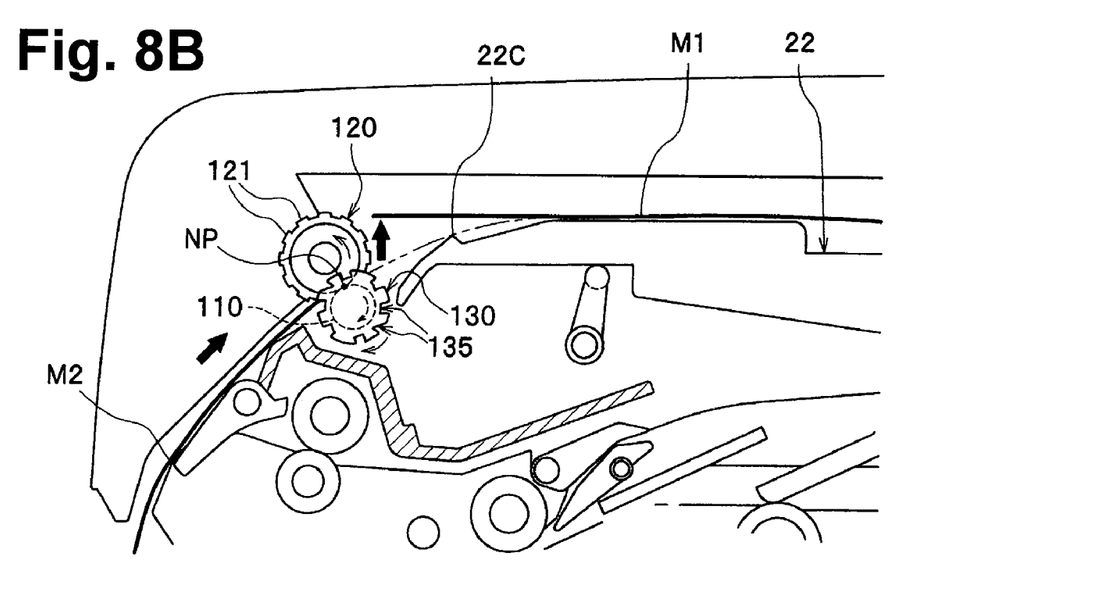

After the trailing end of the preceding original sheet M1 has left the nip portions NP, a portion of the preceding original sheet M1 slightly apart from the trailing end toward the front is supported by the flap 22 positioned above the nip portions NP, so that the trailing end of the preceding original sheet M1 springs back by the resiliency of the preceding original sheet M1 as shown in FIG. 8B.

If the corrugation rollers 130 are configured so as to rotate integrally with the output rollers 110, the trailing end of the preceding original sheet M1 is caught by the grooves 135 on the corrugation rollers 130 rotating by a strong force from the drive source even though the trailing end of the preceding original sheet M1 tries to spring back by its own resiliency, so that the trailing end of the preceding original sheet M1 is kicked downward. However, in this embodiment, the corrugation rollers 130 are capable of rotating relatively with respect to the output rollers 110, the corrugation rollers 130 do not rotate by themselves and hence the trailing end of the preceding original sheet M1 springs back satisfactorily by its own resiliency.

In a case where the trailing end of the preceding original sheet M1 is pushed by the pressing portions 121 of the rotating pinch rollers 120 when the trailing end of the preceding original sheet M1 springs back by its own resiliency, the springback is assisted by the pushing portions 121, so that the springback of the trailing end is ensured.

With such the springback of the trailing end of the preceding original sheet M1, the following original sheet M2 crawls under the preceding original sheet M1 satisfactorily. Since the trailing end of the preceding original sheet M1 moves away from the corrugation rollers 130 due to the springback of the trailing end, even though the grooves 135 on the corrugation rollers 130 are pressed by a leading end of the following original sheet M2 and hence the corrugation rollers 130 are rotated, the trailing end of the preceding original sheet M1 is prevented from being kicked downward by the grooves 135 on the corrugation rollers 130.

<Effects in Stacking Output Mode>

Figure 9A:
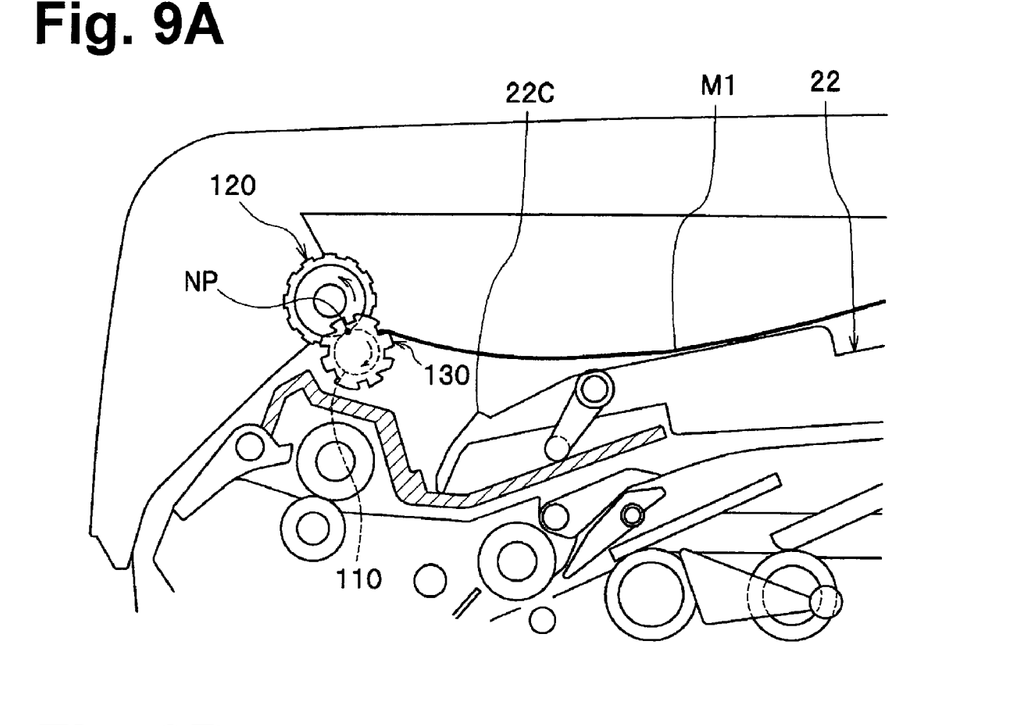
FIGS. 9A and 9B are drawing showing operations in a stacking output mode.
Figure 9B:
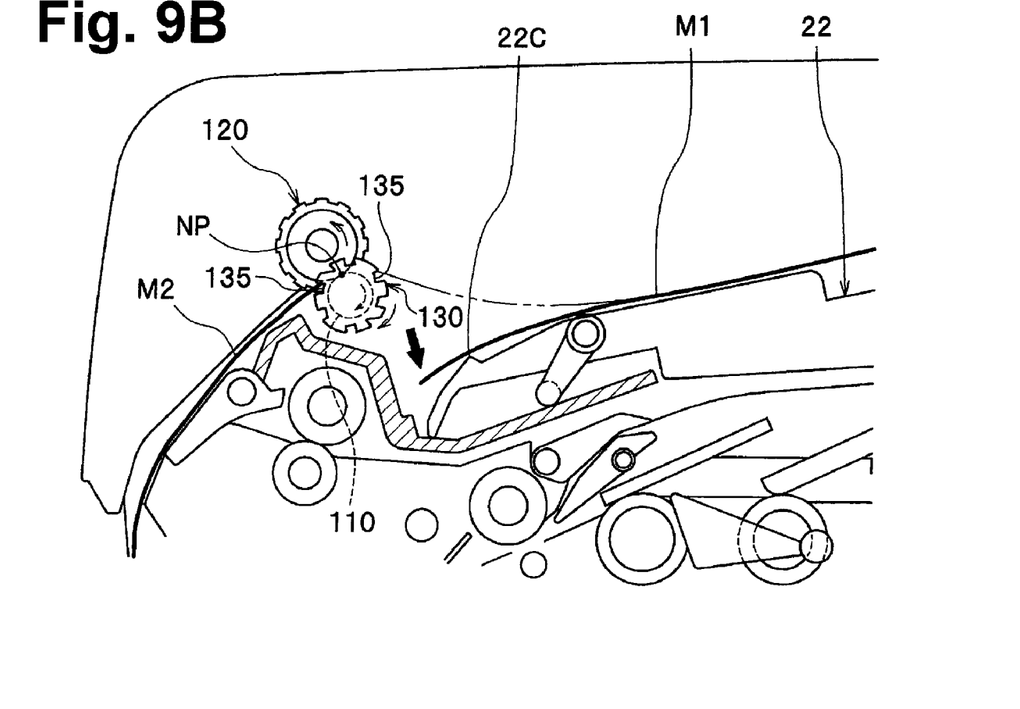

As shown in FIG. 9A, in a case of the stacking output mode, the upstream side portion of the flap 22 (for example, the bent portion 22C) is located downward of the nip portions NP between the output rollers 110 and the pinch rollers 120, so that the trailing end of the preceding original sheet M1 after having left the nip portions NP is placed on the corrugation rollers 130 without springing back. Therefore, as shown in FIG. 9B, when the grooves 135 on the corrugation rollers 130 are pushed by the leading end of the following original sheet M2, the trailing end of the preceding original sheet M1 is kicked downward by the grooves 135 on the corrugation rollers 130. Accordingly, the leading end of the following original sheet M2 is reliably passed above the trailing end of the preceding original sheet M1, so that the following original sheet M2 is reliably stacked on the preceding original sheet M1.

In the configuration, in this embodiment, the following effects are achieved. In the inserting output mode, the trailing end of the preceding original sheet M1 is not kicked downward by the grooves 135 on the corrugation rollers 130 and, in contrast, in the stacking output mode, the trailing end of the preceding original sheet M1 is kicked downward by the grooves 135 on the corrugation rollers 130, so that both the crawling output and the stacked output are preferably achieved.

Since the grooves 135 formed on the peripheral surfaces of the corrugation rollers 130 are employed as the engaging portion which is engageable with the leading end and the trailing end of the original sheet, the height of the wavy shape of the original sheet may be reduced in comparison with a case where protrusions protruding from the peripheral surfaces are employed as the engaging portion. Accordingly, noises generated when deforming the original sheet into a predetermined wavy shape may be restrained.

Since the plurality of corrugation rollers 130 are rotatably provided respectively for the shaft 140 on which the plurality of output rollers 110 are integrally formed, simplification of the structure may be achieved in comparison with the structure in which the plurality of output rollers and the plurality of corrugation rollers are rotatably provided in a device body separately.

Since the protrusions 134 configured to engage the annular grooves 141 formed on the shaft 140 are provided on the corrugation rollers 130, displacement of the corrugation rollers 130 in the axial direction with respect to the shaft 140 is restrained.

Since the corrugation rollers 130 are each formed so as to be reduced in outer diameter as it goes axially outward toward the axial both end portions 136 thereof, the wavy shape of the original sheet may be smoothened, and generation of wrinkles may be restrained.

Since the pushing portions 121 configured to push the trailing end of the original sheet are provided on the pinch rollers 120, the springback of the preceding original sheet M1 in the inserting output mode is accelerated, and the following original sheet M2 is inserted under the preceding original sheet M1 reliably.

The invention is not limited to the embodiment described above, and may be used in various modes as shown below. In the embodiment described above, the grooves 135 formed on the peripheral surfaces of the corrugation rollers 130 are employed as the engaging portions. However, the invention is not limited thereto, and the protrusions protruded from the peripheral surface may be employed as the engaging portions.

In the embodiment described above, the flap 22 as the sheet receiver is pivoted upward and downward with respect to the output roller group 100 in order to switch the output mode. However, the invention is not limited thereto. For example, the output roller group may be moved upward and downward with respect to the sheet receiver, or both the sheet receiver and the output roller group may be moved upward and downward. As the sheet receiver, the one sliding upward and downward may be employed instead of those which pivot. The upward and downward movement described above may be done automatically or manually. Alternatively, the same effects as in this embodiment may be achieved even though the sheet receiver and the output roller group are not moved upward and downward. For example, a configuration in which another sheet receiver can be attached above the sheet receiver described above is also applicable. The inserting output is enabled when the another sheet receiver is attached. The another sheet receiver may be readily prepared or mounted by the user according to the need and does not necessarily have to be provided as a part of a sheet output device.

In the embodiment described above, two each of the annular grooves 141 and the protrusions 134 are provided. However, the invention is not limited thereto, and one or three or more of those may be provided. When two or more of those are provided, by differentiating the width of one of the annular grooves and the protrusions from the width of the other annular grooves and the protrusions, the corrugation roller is prevented from being mounted in the erroneous direction. When three or more of those are provided, by arranging the annular grooves and the protrusions not to be equidistant, the erroneous mount as described above is prevented.

Although the pressing portions 121 are provided at the both ends of the pinch rollers 120 in the embodiment described above, the invention is not limited thereto, and the pushing portion may be provided only at one end of the pinch rollers. In the embodiment described above, the sheet output device is integrated in the original sheet transporting device 3. However, the invention is not limited thereto, and the sheet output device may be integrated in an image forming apparatus such as a printer or a copying machine.

In the embodiment described above, the printed original sheet is used as the sheet. However, the invention is not limited thereto, and unused sheets or OHP sheets may be employed when the output device is applied to the image forming apparatus.

What is claimed is:

1. A sheet output device configured to output a sheet comprising:
    a sheet receiver; and
    a group of rollers including:
        a plurality of output rollers arranged in a widthwise direction of the sheet;
        a plurality of pinch rollers arranged above the plurality of output rollers, each of the plurality of pinch rollers being configured to pinch the sheet with a corresponding one of the plurality of output rollers and to transport the sheet onto the sheet receiver; and
        at least one corrugation roller arranged coaxially with the output rollers, the at least one corrugation roller being disposed between two corresponding output rollers of the plurality of output rollers and having a diameter larger than the plurality of output rollers,
    wherein the plurality of output rollers are configured to be rotatable relative to the at least one corrugation roller, wherein the at least one corrugation roller is configured to rotate independently of the plurality of output rollers by being pushed by a leading end of the transported sheet.

2. The sheet output device according to claim 1 further comprising a moving mechanism, wherein the moving mechanism displaces at least one of the roller group and the sheet receiver relatively upward and downward to switch a state between:
    a first state in which a following sheet is inserted between the sheet receiver and a preceding sheet already outputted on the sheet receiver; and
    a second state in which the following sheet is stacked on the preceding sheet already outputted on the sheet receiver.

3. The sheet output device according to claim 2, wherein the moving mechanism is configured to move at least a portion of the sheet receiver upward and downward.

4. The sheet output device according to claim 1, wherein each of the at least one corrugation roller has a plurality of grooves extending in an axial direction.

5. The sheet output device according to claim 4, wherein each of the plurality of grooves includes a leading end contacting surface configured to contact the leading end of the sheet and a trailing end contacting surface configured to contact a trailing end of the sheet.

6. The sheet output device according to claim 1, further comprising a shaft extending in the widthwise direction of the sheet, wherein
    each of the plurality of output rollers is fixed to the shaft, and
    each of the at least one corrugation roller is rotatably mounted to the shaft.

7. The sheet output device according to claim 6, wherein each of the at least one corrugation roller includes a first portion and a second portion engaged with the first portion, wherein the shaft is interposed between the first portion and the second portion.

8. The sheet output device according to claim 7,
    wherein the shaft is formed with an annular groove extending over an entire circumference thereof, and
    the first portion and the second portion of the at least one corrugation roller include a protrusion engaging the annular groove.

9. The sheet output device according to claim 1, wherein an outer diameter of each of the at least one corrugation roller reduces toward both ends in an axial direction.

10. The sheet output device according to claim 9, wherein the outer diameter of the each of the at least one corrugation roller, including an outer diameter of a plurality of grooves formed thereon, gradually narrows toward both ends in the axial direction.

11. The sheet output device according to claim 1, wherein each of the plurality of pinch rollers includes a plurality of pushing portions at an end portion thereof, the plurality of pushing portions being configured to push the sheet downstream in a transport direction.

12. An original sheet transporting device comprising:
    an input tray on which an original sheet is stacked;
    a sheet output device; and
    a feed mechanism configured to feed the original sheet from the input tray to the sheet output device,
    wherein the sheet output device comprises:
        a sheet receiver; and
        a group of rollers including:
            a plurality of output rollers arranged in a widthwise direction of the sheet;

a plurality of pinch rollers arranged above the plurality of output rollers, each of the plurality of pinch rollers being configured to pinch the sheet with a corresponding one of the plurality of output rollers and transport the sheet onto the sheet receiver; and at least one corrugation roller arranged coaxially with the output rollers, the at least one corrugation roller being disposed between two corresponding rollers of the plurality of output rollers and having a diameter larger than the plurality of output rollers, wherein the plurality of output rollers are configured to be rotatable relative to the at least one corrugation roller, wherein the at least one corrugation roller is configured to rotate independently of the plurality of output rollers by being pushed by a leading end of the transported sheet.

* * * * *